J. A. WHITE.
FLEXIBLE COUPLING FOR SHAFTS.
APPLICATION FILED FEB. 9, 1910.
982,164.
Patented Jan. 17, 1911.
2 SHEETS—SHEET 1.
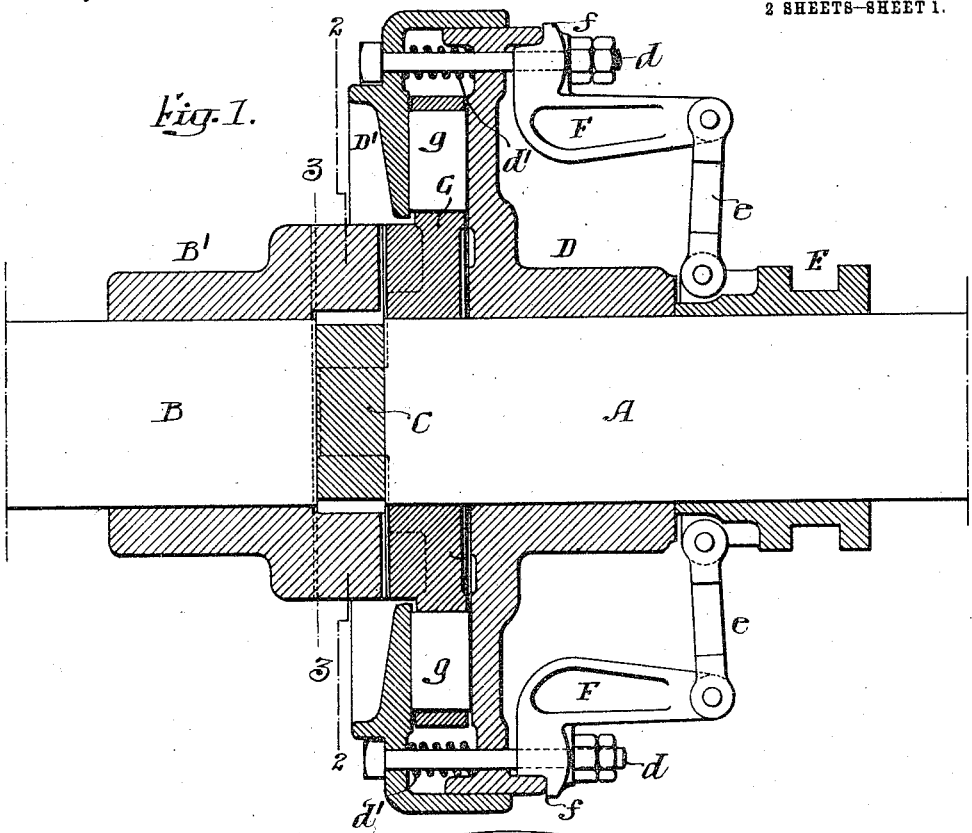
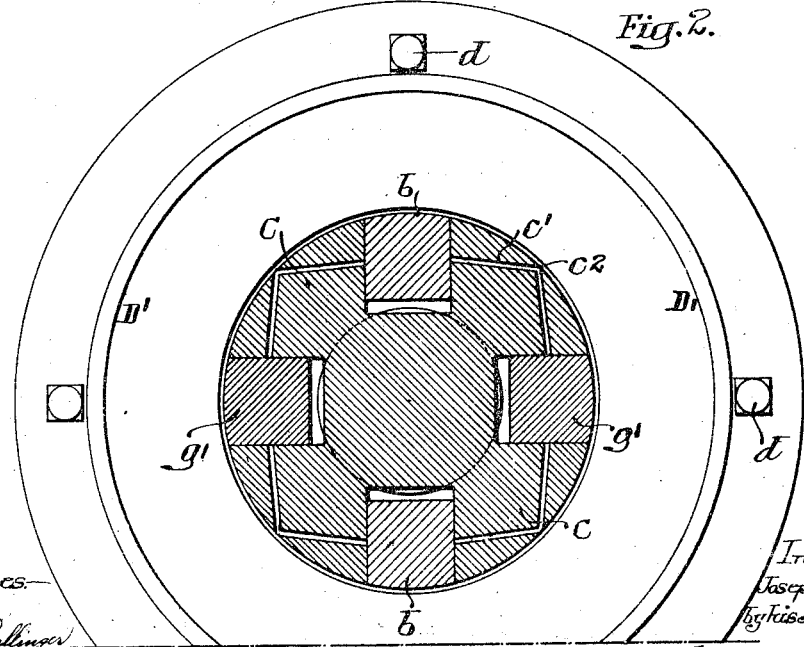
Witnesses:
Inventor:
Joseph A. White
By his Attorneys

J. A. WHITE.
FLEXIBLE COUPLING FOR SHAFTS.
APPLICATION FILED FEB. 9, 1910.

982,164.

Patented Jan. 17, 1911.

2 SHEETS—SHEET 2.

Witnesses:

Inventor:
Joseph A. White.
by his Attorneys

UNITED STATES PATENT OFFICE.

JOSEPH A. WHITE, OF PHILADELPHIA, PENNSYLVANIA, ASSIGNOR TO THE MOORE AND WHITE COMPANY, OF PHILADELPHIA, PENNSYLVANIA, A CORPORATION OF PENNSYLVANIA.

FLEXIBLE COUPLING FOR SHAFTS.

982,164.  Specification of Letters Patent.  Patented Jan. 17, 1911.

Application filed February 9, 1910. Serial No. 542,833.

*To all whom it may concern:*

Be it known that I, JOSEPH A. WHITE, a citizen of the United States, residing in Philadelphia, Pennsylvania, have invented certain Improvements in Flexible Couplings for Shafts, of which the following is a specification.

One object of my invention is to provide means for flexibly coupling two shafts, and a further object of the invention is to so construct the coupling means that it can be used in connection with clutch mechanism, in order that the clutch will operate properly even if the shafts are slightly out of alinement.

Figure 5:
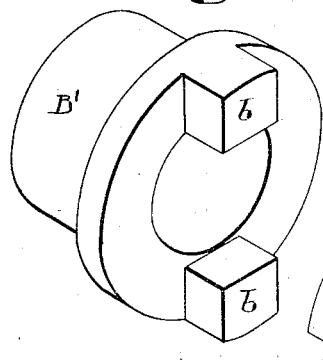
Figure 6:
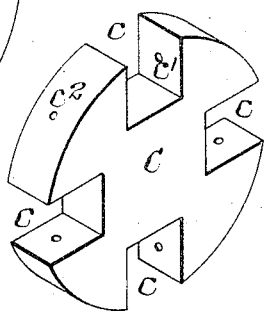
Figure 4:
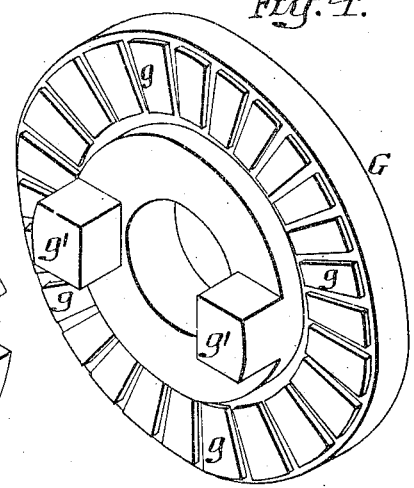
Figure 3:
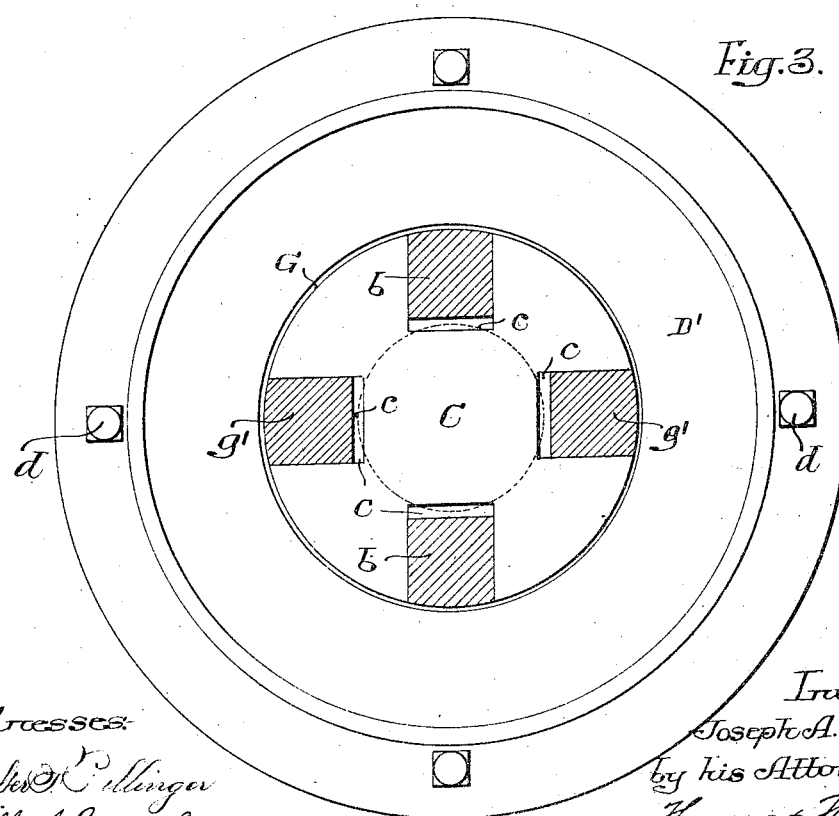

In the accompanying drawings:—Figure 1, is a longitudinal sectional view of a clutch illustrating my invention; Fig. 2, is a sectional view on the line 2—2, Fig. 1; Fig. 3, is a sectional view on the line 3—3, Fig. 1; Fig. 4, is a perspective view of the clutch disk; Fig. 5, is a perspective view of the collar; and Fig. 6, is a detached perspective view of a coupling disk.

A is a driving shaft and B is the driven shaft in the present instance, and located between these two shafts is the coupling disk C.

D is a fixed clutch member which is secured to the shaft A in any suitable manner. Adapted to slide longitudinally on this clutch member is the clutch ring D'.

E is a sliding sleeve which is shifted by any suitable mechanism, and this sleeve is connected to levers F by links $e$. These levers are fulcrumed at $f$ on the section D of the clutch, and passing through the two clutch members and the levers are bolts $d$ having springs $d'$ which separate the clutch members as soon as released from the control of the levers.

Mounted between the two clutch members D, D' is the clutch disk G, having friction blocks $g$ located in sockets at intervals, as shown in Fig. 4. This clutch disk is loose on the shaft and, in the present instance, is located at the extreme end of the shaft.

B' is a collar secured to the shaft B. The coupling disk C is located between the ends of the two shafts, as illustrated in Fig. 1, and is notched at $c$, there being four notches in the present instance. On the hub of the clutch disk G are two projections $g'$ which extend into two of the notches in the coupling disk C, and on the collar B' are two projections $b$, $b$ which enter the other two notches $c$, $c$ in the disk C. By this construction the clutch disk G is positively coupled to the collar B' and the shaft B, and in ordinary clutches of this type it is essential that the two shafts A and B shall be absolutely in alinement, but by the above construction it is not necessary that the two shafts be absolutely in line, as the notches in the coupling disk are of such a depth that the projections $g'$ and $b$ each has independent movement; the projections fitting snugly between the sides of the recesses, so that there is no rattle due to lost motion.

It will be understood that while I have shown my invention as applied to a clutch of a given type, it can be used with clutches of other types, where a hub or disk is clamped and is connected to a driving or driven element, or may be used in coupling two shafts where the clutch is not used.

In order to lubricate the coupling disk I provide ducts $c'$, as illustrated in Fig. 2, which lead to the side walls of the notches and communicate with an opening $c^2$ in the periphery of the disk, so that oil projected into the opening will flow through the ducts to the bearing surfaces of the disk and thus thoroughly lubricate the parts.

I claim:—

1. The combination in a clutch, of two shafts, a coupling disk located between the two shafts, a collar on one shaft, and a clutch disk on the other shaft, said collar and clutch disk having portions engaging the coupling disk, so that while one must turn with the other they have a limited independent lateral movement.

2. The combination in a clutch, of two shafts, an intervening coupling disk having notches therein, a clutch member secured to one of the shafts, a clutch disk loosely mounted on said shaft, mechanism for coupling the clutch disk to the clutch member, projections on the clutch disk extending into notches in the coupling disk, and a collar on the other shaft having projections extending into the notches in the coupling disk.

In testimony whereof, I have signed my name to this specification, in the presence of two subscribing witnesses.

JOSEPH A. WHITE.

Witnesses:
 WM. E. SHUPE,
 WM. A. BARR.